United States Patent [19]

Melara

[11] 4,290,166
[45] Sep. 22, 1981

[54] SELF-ALIGNING TWIN-WHEELED CASTER

[76] Inventor: Francescantonio Melara, Via Ferrarese, 8, Bologna, Italy

[21] Appl. No.: 50,035

[22] Filed: Jun. 19, 1979

[30] Foreign Application Priority Data

Jun. 26, 1978 [IT] Italy ................................. 3480 A/78

[51] Int. Cl.³ ............................................ A47B 91/00
[52] U.S. Cl. ...................................................... 16/47
[58] Field of Search ..................... 16/47, 35 R, 44, 48; 188/10

[56] References Cited

U.S. PATENT DOCUMENTS 3,914,821 10/1975 Screen ................................. 16/35 R
4,077,088 3/1978 Melara ..................................... 16/47

FOREIGN PATENT DOCUMENTS 47804 7/1978 Netherlands ............................ 16/19
1428451 3/1976 United Kingdom .................... 16/47

Primary Examiner—Doris L. Troutman

[57] ABSTRACT

A self-aligning twin-wheeled caster is disclosed which comprises a vertical wall, a shaped seat perpendicular to the wall, a pair of rotating wheels fixed to both ends of a shaft located in the seat, a sleeve in the wall with a rotatably carried pin. Each wheel has a hub portion, which is provided with outer collars facing front projections of both sides of the wall, teeth contoured over an arc of a circle, which define shoulders opposite to the projections and capable to axially retain the wheels. The caster further comprises front bushings on both sides of the wall, which are coaxial with the seat so as to receive the hub portions.

2 Claims, 3 Drawing Figures

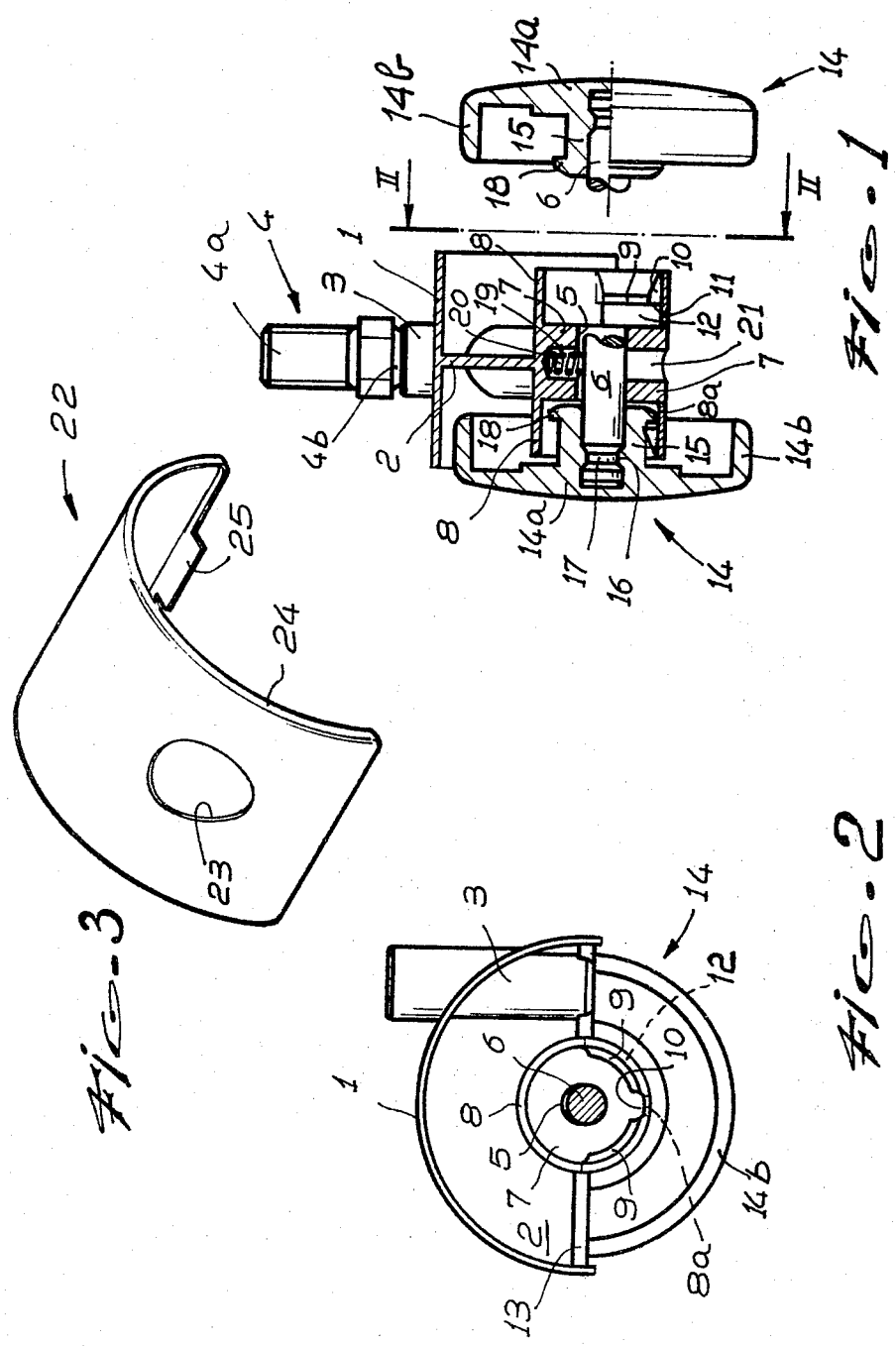

SELF-ALIGNING TWIN-WHEELED CASTER

BACKGROUND OF THE INVENTION

This invention relates to a self-aligning twin-wheeled caster.

Widespread acceptance has been gained, particularly for furniture items and the like articles, by self-aligning casters which comprise, in a known manner, two wheels rotatively mounted to the ends of a horizontal shaft or axle which is accommodated in a seat defined by a vertical wall, a middle wall, and a shroud or guard enclosing the wheels.

The shroud and middle wall further include a sleeve which is open at the top and carries pivotally a vertical self-alignment surface.

A frequently encountered problem with conventional self-aligning casters is that dirt, hair, threads, and other materials tend to lodge themselves between such wheels and shaft, thus unavoidably hindering the ability of the wheels to rotate and, consequently, the caster operation.

Furthermore, when applied to a chair, conventional casters are often a cause of inconvenience and potential hazard, since the chair is allowed to roll on its casters even before the user has a chance to sit on it.

For strength and appearance reasons, moreover, the trend favors casters wherein the above mentioned shroud and wall are made of metal, instead of plastics, even if obviously the cost of metal casters is higher.

SUMMARY OF THE INVENTION

This invention sets out to provide a self-aligning twin-wheeled caster which may be successfully produced from quite inexpensive materials, and is capable of retaining its operational effectiveness over a long time period, and wherein in particular said tendency to collect dirt on its inside is effectively eliminated.

Within that general aim, it is further possible to arrange that the self-aligning caster of this invention reduces to a minimum any inconvenience and potential hazard, as resulting from unwanted movements of the chair whereto the caster is applied.

It is further possible to arrange that the self-aligning caster according to this invention is of simple and strong structure, which is quick to assemble, and attractive in appearance.

According to one aspect of the present invention, there is provided a self-aligning twin-wheeled caster of a type comprising a vertical wall, a shaped seat formed through said wall perpendicularly thereto and defining tubular front projections on both sides of said wall, a shaft carried by said seat and having its opposite ends extending outwardly from said seat on both sides thereof, a pair of wheels rotatably secured to said opposite ends and having tubular hub portions, provided with outer collars facing said projections, a sleeve formed in said wall and contained in the same plane as said wall and pependicular and offset with respect to said seat, a rotatably carried pin in said sleeve adapted for insertion into a vertical housing of the article whereto the caster is mounted, said caster being characterized in that it further comprises front bushings defined on both sides of said wall and arranged coaxial with said seat such as to receive said hub portions provided with collars, teeth contoured over an arc of a circle internally and at the bottom of said bushings and close to the free ends of said bushings, said teeth defining respective shoulders, which being opposite to said projections, are adapted for engagement behind said collars for axially retaining said wheels.

BRIEF DESCRIPTION OF THE DRAWING

Further details will be more clearly understood from the following detailed description of a preferred embodiment of this self-aligning twin-wheeled caster, illustrated by way of representation in the accompanying drawing, where:

FIG. 1 is a partially cutaway, axially vertical sectional view of the caster with one wheel shown separated;

FIG. 2 is a vertical sectional view of the caster taken along the line II—II of FIG. 1; and FIG. 3 is a perspective view of a metal cover adapted to overlie the caster shroud.

DESCRIPTION OF THE PREFERRED EMBODIMENTS

With reference to the drawing figures, there is indicated at 1 a shaped housing or shroud of the self-aligning caster which comprises one half of a cylinder side surface, having its axis horizontal and the convex side facing upwards. Within the concavity or hollow of the shroud 1, there is provided a wall 2, made of a plastic material integrally with the shroud, the wall 2 being contained in the midplane of the shroud and extending in a vertical direction, perpendicular to the shroud axis. In the wall 2, a vertical sleeve 3 of sort is formed which extends above the shroud and is located at a given distance apart from said horizontal axis of the shroud. Inside the sleeve 3, a vertical metal pin 4 is carried rotatably, ending, above the sleeve, in a threaded portion 4a for securing the caster to the item of furniture for which it is intended. For greater strength, a portion 4b, wherewith the pin penetrates the sleeve 3, has a downwardly converging truncated cone shape.

At the horizontal axis of the shroud 1, the wall 2 has a through seat 5 which is penetrated by the central portion of a metal shaft 6. The through seat 5 is further extended in a pair of tubular projections 7, located opposite to either faces of the wall 2. The tubular projections 7 are extended, along their peripheral edges, into bushings 8 which are also located opposite to either faces of the wall 2 and coaxial with said through seat 5. The bushings 8 extend axially over a length only slightly smaller than the shroud 1, and each of them is provided with a respective pair of teeth 9 therein, close to its free end.

The teeth 9 extend over an arc of a circle, substantially along the lower half of the bushings 8, and are centrally separated by a cutout 10. Towards the caster inside, the teeth 9 define respective shoulders 11, which are opposite to said tubular projections 7. Towards the caster outside, on the other hand, the teeth 9 are conically bevelled to produce a sawtooth profile. Cuts or slots 12 are executed (on account of the molding process used for the shroud 1 and wall 2 of the caster) in the bushings 8; the cuts are located at the teeth 9 and arranged between such teeth and the tubular projections 7.

Externally to the tubular projections 7, the wall 2 is stiffened along its diametrical edge by a rib 13.

The two ends of the shaft 6 project outwardly from both free ends of the bushings 8. To these ends, there are attached rotatably twin or paired wheels 14. The wheels, which are also made of a plastic material, have a circular wall 14a, which is solid and slightly crowned externally, and a peripheral rim 14b facing inwardly. At the center of the wall 14a, each wheel has one portion of a tubular hub 15, which faces inwardly and is adapted for engagement with a corresponding end of the shaft 6. Inside the tubular hub 15, each wheel is suitably provided with a shaped annular jut 16 adapted for force fitting into a corresponding annular groove 17 formed at each end of the shaft 6.

The hub 15 of each wheel 14 ends in an outer collar 18, the outer edge whereof is suitably bevelled and rounded off.

The hubs 15 of the wheels are intended for accommodation within the bushings 8, the collars 18 being snap engaged behind the shoulders 11 of the teeth 9, for the axial retention of the wheels. Intermediate to the tubular projections 7, a vertical seat 19 is formed which is open downwards and towards the seat 5; the vertical seat or hole 19 accommodates a helical spring 20. A second through hole 21 is formed in the opposite side of the seat 5, in alignment with the hole 19, such as to allow the spring 20 to be inserted into the hole 19, with the shaft 6 not yet inserted in the seat 5. The spring 20 is operative to urge the shaft 6 downwards, as well as to frictionally engage the shaft and prevent it from rotating within the seat 5. Obviously, the spring 20 may be replaced by a small cylinder of an elastic material. It should be noted that, as illustrated in FIGS. 1 and 2, the seat 5 is slightly elongated in a vertical plane perpendicular to the wall 2.

When it is desired to confer to the shroud 1 a metallic appearance, the same may be overlaid with a cover 22, as shown in detail in FIG. 3. The cover 22, which is obtained by shearing and bending from sheet metal, is shaped to accurately fit the shaped shroud 1. The cover 22 is also provided with a shaped hole 23 for surrounding the intersection point of the sleeve 3 with the shroud 1; the cover 22 further includes along its edges a curled edge 24, which will enclose the shroud thickness, while along its transversal edges it comprises tabs 25 which are bent over to hook onto the shroud.

The caster of this invention operates as follows.

With the caster mounted to a chair and the user not sitting on the chair, the spring 20 urges the shaft 6 to practically contact the bottom of the seat 5, thus providing a sliding contact between the hub 15 of the wheels and the bottom of the bushings 8. Depending on the dimensions and tolerances selected for manufacturing the caster, that sliding contact may either occur between the outer surface of the outer collar 18 of the hub 15 and the tips of the two respective teeth 9; or between the periphery of the outer collar 18 and the respective portion 8a of said bushings, which corresponds to said cutout 10 and which is included between the cuts 12 in the bushing bottoms; or in both such modes.

The wheels, which are braked by said sliding contact, prevent the chair from rolling away even when a strong and deliberate push is applied thereto.

By contrast, when the user is sitting on the chair, his/her weight will compress the spring 20, thereby, said sliding contact being removed, the user is enabled to move the chair around as desired.

It should be noted that in this condition, the shaft 6 and wheels 14 are enabled to oscillate in said vertical elongated plane containing the seat 5; the collars 18 have in fact a limited play between the teeth 9 and projections 7, and the pin has a limited play in that seat. By providing such an oscillatory capability, it is ensured that both wheels contact the resting surface of the chair even if this surface happens to be only imperfectly smooth, and shows small irregularities; even when the surface is not perfectly smooth, the two wheels 14 can rotate differently from each other. The caster may also be spring mounted only; it will be sufficient that, with the chair empty and the spring 20 urging the shaft 6 against the bottom of the seat 5, the hubs of the wheels be prevented from reaching positions 1 of sliding contact with portions of the bushings 8. On the other hand, the caster can also be neither braked nor spring mounted: as mentioned, in fact, the body of the shroud 1 and wall 2 is produced by molding from a plastic material; the plug, which is provided in the mold to define the seat 5, may be made replaceable, and accordingly, in one instance, may provide a perfectly cylindrical seat having a diameter equal to the diameter of the pin 6, and in another instance, may provide instead a vertically elongated seat, as mentioned hereinabove.

It should be noted that the bushings 8 cover both the hubs 15 of the two wheels 14 and the shaft 6, thus preventing dirt and other debris collected at the periphery of the wheels from depositing on said hubs 15 and shaft 6.

It is particularly noteworthy that thanks to the considerable strength of the connection between the wheels 14 and bushings 8, it is possible, if desired, to construct the shroud 1 and the wheels themselves from more economical materials, as well as to provide a coupling of the shaft 6 to the hubs 16 of the wheels without the lugs 16 and annular grooves 17, while retaining a stable mounting for the wheels themselves.

I claim:

1. A self-aligning twin-wheeled caster of a type comprising a vertical wall, a seat formed through said wall perpendicularly thereto elongated in a vertical direction and defining tubular front projections on both sides of said wall, a shaft carried in said seat and having its opposite ends extending outwardly from said seat on both sides thereof, a pair of wheels rotatably secured to said opposite ends and having tubular hub portions provided with outer collars facing said projections, a sleeve formed in said wall and contained in the same plane as said wall and perpendicular and offset with respect to said seat, a rotatably carried pin in said sleeve adapted for insertion into a vertical housing of the article whereto the caster is mounted, front bushings defined on both sides of said wall and arranged coaxial with said seat such as to receive said hub portions provided with collars, wherein according to the improvement the castor further comprises a hole formed in said wall and intersecting said seat, elastic means arranged in said hole and acting on said shaft to bring said hub portions in sliding contact with lower portions of said bushings, teeth contoured over an arc of a circle internally and at the lower half of said bushings, and close to the free ends of said bushings, said teeth defining respective shoulders adapted for snap engagement behind said collars for axially retaining said wheels.

2. A caster according to claim 1, characterized in that said teeth are centrally separated by a cutout, and that between said teeth and the tubular projections slots are formed which are separated by a portion of said bushing arranged in correspondence of said cutouts.

* * * * *